United States Patent [19]

Yoshizawa

[11] Patent Number: 4,804,955

[45] Date of Patent: Feb. 14, 1989

[54] RADIO PAGER HAVING A LIGHT-EMITTING DIODE FOR PROVIDING VISUAL ALARM AND SIGNAL TRANSMISSION

[75] Inventor: Shigeo Yoshizawa, Tokyo, Japan

[73] Assignee: NEC Corporation, Tokyo, Japan

[21] Appl. No.: 8,238

[22] Filed: Jan. 29, 1987

[30] Foreign Application Priority Data

Jan. 31, 1986 [JP] Japan ............................ 61-018224
May 16, 1986 [JP] Japan ............................ 61-110488

[51] Int. Cl.[4] ............................................ H04Q 1/00
[52] U.S. Cl. ......................... 340/825.44; 340/825.47; 340/825.48
[58] Field of Search ........................ 340/825.4–825.48, 340/311.1; 455/600, 603, 606, 608, 609, 613

[56] References Cited

U.S. PATENT DOCUMENTS

| | | | |
|---|---|---|---|
| 3,846,783 | 11/1974 | Apsell et al. | 340/825.44 |
| 4,021,608 | 5/1977 | Brodenr | 340/825.44 X |
| 4,201,907 | 5/1980 | Otten | 455/613 X |
| 4,462,030 | 7/1984 | Ishii | 340/825.44 |

FOREIGN PATENT DOCUMENTS

| | | | |
|---|---|---|---|
| 0067825 | 1/1979 | Japan | 455/61 |
| 0139285 | 7/1983 | Japan | 455/613 |
| 0169237 | 9/1984 | Japan | 455/613 |

*Primary Examiner*—Ulysses Weldon
*Attorney, Agent, or Firm*—Sughrue, Mion, Zinn, Macpeak and Seas

[57] ABSTRACT

A selective calling radio pager comprising a circuit that receives a calling address signal transmitted on a radio channel and generates a flashing signal in response to the calling address signal. A control circuit is provided for writing the received calling address signal into a memory in response to the receiving circuit and reading the calling address signal from the memory in response to a manual command signal. The pager is provided with a light-emitting diode which is responsive to the flashing signal and the calling address signal read out of the memory for supplying an optical signal to an external device. The external device is provided with a photodetector for converting the optical signal to a corresponding electrical signal and a second light-emitting diode responsive to an output signal from the photodetector for giving visual alarm indication when the pager is placed on the external device.

8 Claims, 7 Drawing Sheets

RADIO PAGER HAVING A LIGHT-EMITTING DIODE FOR PROVIDING VISUAL ALARM AND SIGNAL TRANSMISSION

BACKGROUND OF THE INVENTION

The present invention relates to a selective calling radio pager.

Selective calling radio pagers are becoming compact and multi-functional in order to meet a variety of users' needs. A recent version of radio pagers includes a memory for storing received calling address signals and time signals to permit later retrieval for generating a print of the received signals. However, the coupling between the radio pager and printer is by means of metal contacts. Since the radio pager is always carried by the user, the metal contacts are liable to corrosion due to exposure and a high contact resistance can result. Furtheremore, the demands for compactness require that the metal contacts be small as possible while ensuring the necessary reliability. As a result, the metal contacts must meet close manufacturing tolerances at the expense of cost.

SUMMARY OF THE INVENTION

Accordingly, an object of the present invention is to provide a selective calling radio pager having a light-emitting diode that shines for visual alarm indication and for transmission of received signals to an external device.

Specifically, a selective calling radio pager of the present invention receives a code signal transmitted on a radio channel and generates a flashing signal in response to the reception of the code signal. A control circuit is provided for writing the received code signal into a memory in response to the receiving circuit and reading the code signal from the memory in response to a manual command signal. The pager is provided with a light-emitting diode which is responsive to the flashing signal and the code signal read out of the memory for supplying an optical signal to an external device. The external device is provided with a photodetector for converting the optical signal to a corresponding electrical signal and a second light-emitting diode responsive to an output signal from the photodetector for giving visual alarm indication when the pager is placed on the external device.

Preferably, the pager is provided with a framing circuit for organizing the code signal read out of the memory into a frame signal in response to the command signal by appending a sync signal to a starting point of the code signal and appending an end-of-data signal to an ending point of the code signal, the frame signal being applied to the first light-emitting diode. A trigger circuit causes an end-of-data signal to be generated and applied to the light-emitting diode in response to the receiving circuit when a new code signal is received while the pager is reading stored data from the memory to the external device. The external device is provided with a detector circuit connected to the photodetector for detecting the sync signal and the end-of-data signal. The output of the photodetector is supplied to the second light-emitting diode in response to an output signal of the detector circuit which is generated when an end-of-data signal is detected to provide a visual alarm indication from the external device and alternatively supplied to a processing circuit of the external device when the sync signal is detected.

BRIEF DESCRIPTION OF THE DRAWINGS

The present invention will be described in detail with reference to the accompanying drawings, in which.

DETAILED DESCRIPTION

Figure 2:
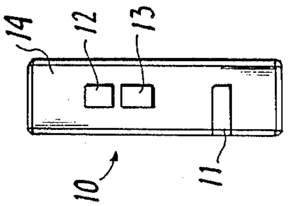
FIG. 2 is an end view of the radio pager of the invention.
Figure 3:
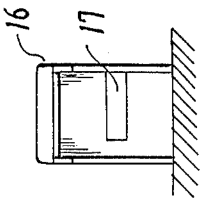
FIG. 3 is a partial view of the printer of FIG. 1.
Figure 1:
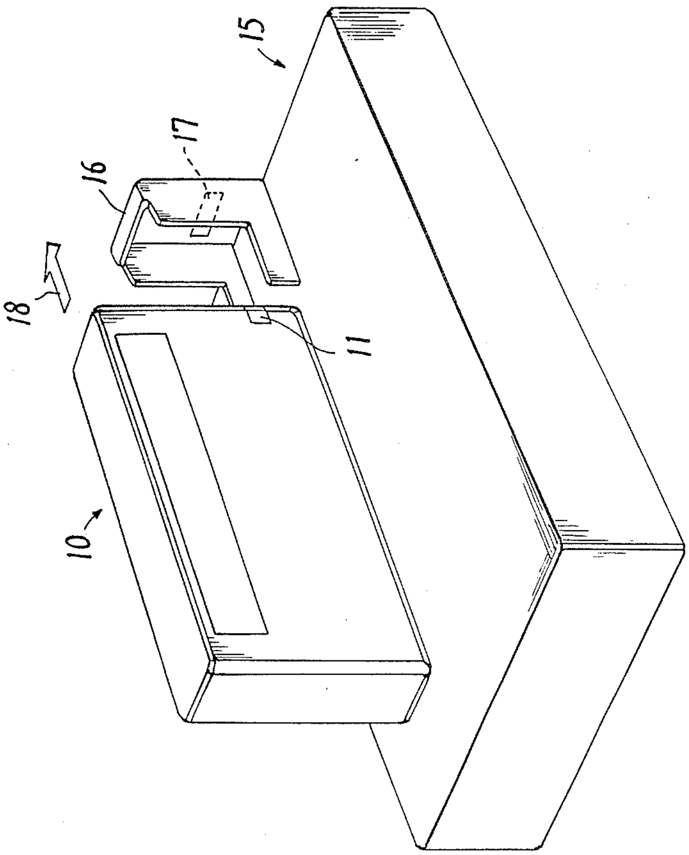
FIG. 1 is a perspective view of a radio pager of the present invention placed on a compact printer.

As shown in FIGS. 1 to 3, a radio pager 10 embodying the present invention has a light-emitting diode 11, a manually operated reset switch 12 and a print control switch 13, all of which are located on one end wall 14 of the pager. A compact printer 15 is shown having a light shield 16 in which a photodiode 17 is located. Radio pager 10 is placed on the printer 15 as indicated and slid into the light shield 16 in the direction of arrow 18 so that light-emitting diode 11 and photodiode 17 are opposed in proximity to each other to establish an optical path for transmitting signals from pager 10 to printer 15. Light shield 16 optically isolates the photodiode from external light.

Figure 4:
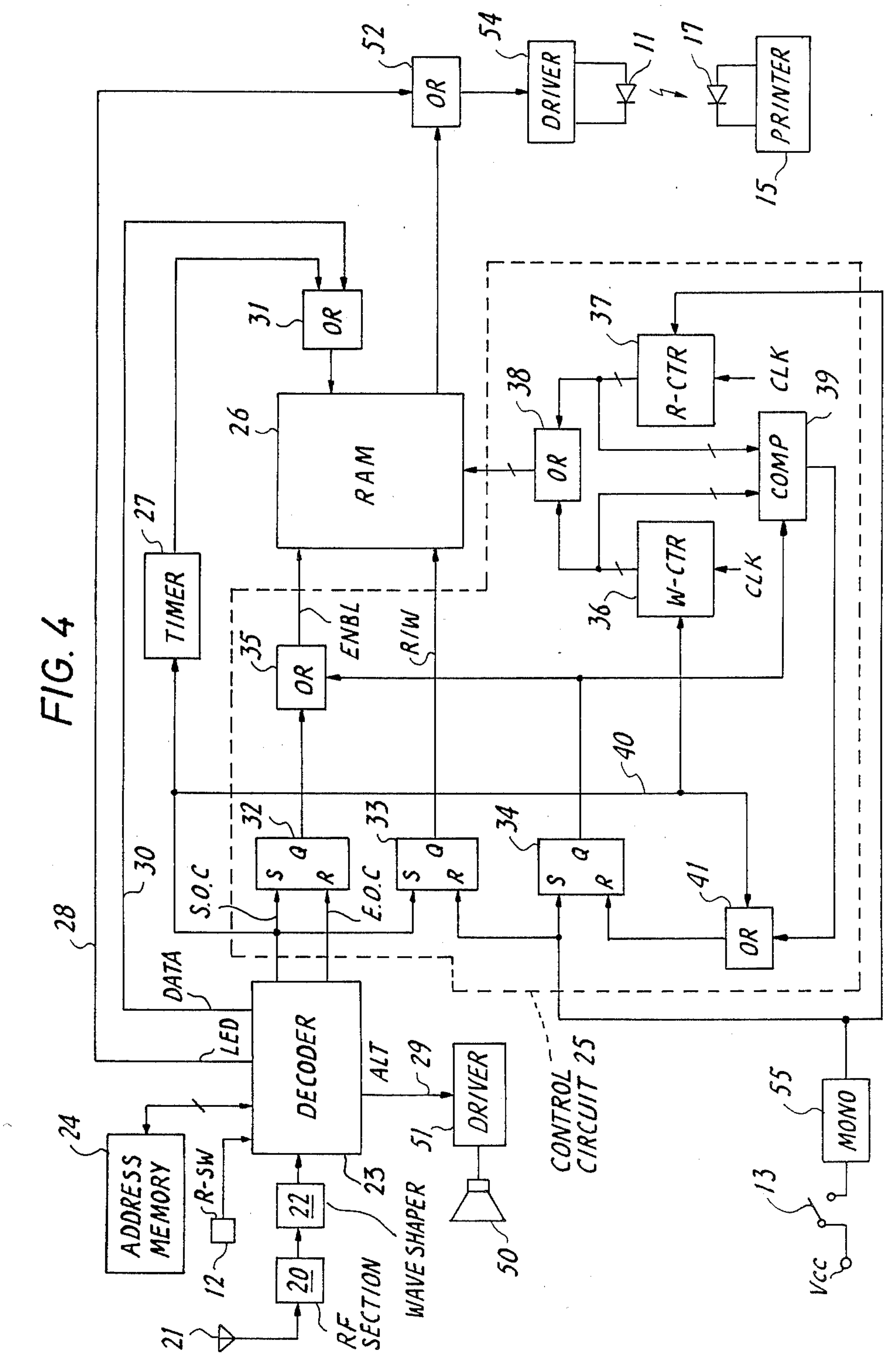
FIG. 4 is a circuit diagram of the radio pager according to a first embodiment of the invention.

In FIG. 4, there is shown a pager circuit according to a first embodiment of the invention. The pager circuit generally comprises a radio frequency section 20 connected between antenna 21 and waveshaper 22, a decoder 23, a subscriber address memory 24, a control circuit 25, a data memory or RAM (random access memory) 26 and a timer 27. The paging signal transmitted from a central station comprises a calling address signal of a predetermined wordlength represented by a fixed number of binary digits. The paging signal is modulated upon a radio frequency carrier and broadcast. A signal intercepted by the antenna 21 is amplified and demodulated into the original baseband signal by the radio frequency section 20 and waveshaped by the waveshaper 22 into a rectangular waveform having sharply distinguishable levels. Subscriber address memory 24 stores a plurality of identification codes to identify source stations. The received calling address is checked against each of the stored identification codes, and if it matches one of the stored codes, the decoder 23 applies a start-of-call signal to the control circuit 25 and provides a flashing signal to a conductor 28 and a tone signal to a conductor 29. The flashing signal and the tone signal have particular visual and sound repetition patterns which can easily be distinguishable from each other by the user. The calling address signal is supplied on conductor 30 to an OR gate 31 where it is combined with a time signal generated by the timer 27 and fed to a data input terminal of memory 26. At the end of the received data, an end-of-call signal is applied to the control circuit 25.

Control circuit 25 includes flip-flops 32, 33 and 34. Flip-flops 32 and 34 supply enabling signals through an OR gate 35 to the RAM 26 and flip-flop 33 supplies a logical 1 (write-in) signal and a logical 0 (read-out) signal to operate the memory 26 in one of read and write modes. Memory 26 is addressed by a circuit including a write-in counter 36, a read-out counter, 37, an OR gate 38 and a digital comparator 39.

Figure 5:
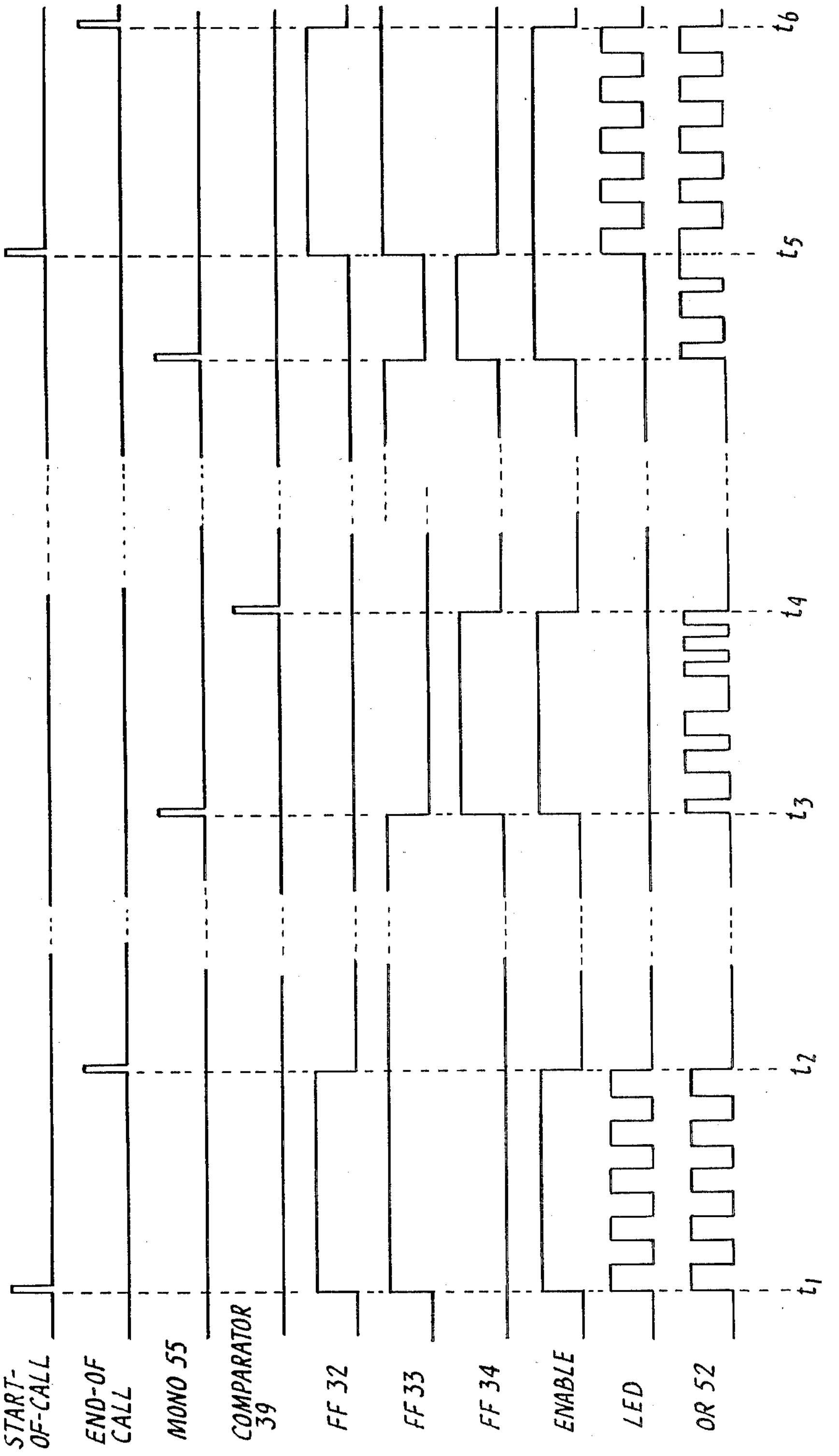
FIG. 5 is a timing diagram associated with the first embodiment.

The operation of the control circuit 25 will be best understood with reference to FIG. 5. When a received calling address signal coincides with one of the stored identification codes in memory 24, a loudspeaker 50 is energized by a tone signal of a particular sound pattern via driver 51 to audibly attract the attention of the user. A flashing signal of a particular pattern is applied on conductor 28 to one input of an OR gate 52 which takes another input from the output of RAM 26.

A start-of-call signal is applied at time $t_1$ to the set inputs of flip-flops 32 and 33 to enable the calling address and time signals to be written into the memory 26. The data output terminal of RAM 26 is low, enabling the OR gate 52 to pass the flashing signal to an LED driver 54 to excite the light-emitting diode 11. The start-of-call signal is also applied to conductor 40 to put the flip-flop 34 under reset condition through an OR gate 41 and enable the write-in counter 36 to initiate counting clock pulses. A series of binary address data is developed by the write-in counter 36 and supplied through OR gate 38 to write the data supplied through OR gate 31. Write-in counter 36 continues count operation until it reaches a predetermined count value which corresponds to the number of binary digits to be stored into RAM 26. The memory address data obtained at the end of the write-in operation is fed to the digital comparator 39 for comparison with an output of read-out counter 37 when comparator 39 is enabled in response to an output of flip-flop 34. An end-of-call signal is generated at time $t_2$ after the write-in operation is complete. This signal resets the flip-flop 32 to permit reception of a subsequent paging signal or printout operation.

If paging signals are sequentially received one after another, the above mentioned process is repeated to store such paging signals into address locations of the memory 26 adjoining the address locations in which the previously stored paging signal is stored. In this way, the write-in counter 36 is sequentially incremented to store a plurality of successively arrived paging signals into RAM 26.

In response to the operation of a print command switch 13 at time $t_3$, a monostable multivibrator 55 produces a trigger pulse that causes the read/write flip-flop 33 to go logical 0, enabling data read-out from RAM 26 and causes flip-flop 34 to go logical 1, enabling the digital comparator 39 to detect coincidence between read and write address data. At the same time, the read-out counter 37 is enabled to count clock pulses for generating read-out address data. The read-out count operation starts with a memory address corresponding to the initial storage location of memory 26. Read-out address is supplied to RAM 26 through OR gate 38 to sequentially access the stored data until the read-out address coincides with the last write-in address data generated by the write-in counter 36. This coincidence is detected by the comparator 39 at time $t_4$ to supply a logical 1 output through OR gate 41 to the reset input of flip-flop 34. The memory enable terminal is switched to logical 0 for data read-out. Since the conductor 28 is at logical 0, the OR gate 52 is enabled to pass data read out of RAM 26. In this way, the light-emitting diode 11 is excited in accordance with the bit pattern of the retrieved data, producing an optical signal. This optical signal is converted by photodiode 17 into a corresponding electrical signal to provide a printout of the stored data. It is seen that the light-emitting diode provides the dual functions for giving a visual alarm indication in response to the reception of a call when the pager is carried by the user and for converting data read out of the memory into an optical signal for printout.

Assume that a paging signal is received during a print operation, causing a start-of-call signal and an LED flashing signal to be generated at time $t_5$. The start-of-call signal causes flip-flops 32 and 33 to switch to logical-1 and logical-0 output states, respectively. RAM 26 switches to write-in mode and its data output goes logical 0, allowing the OR gate 52 to pass the flashing signal to LED driver 54. Loudspeaker 50 is sounded to alert the user of the arrival of a new paging signal. Thus, the print operation is disabled to permit the newly arrived paging signal to be stored into RAM 26.

Figure 6:
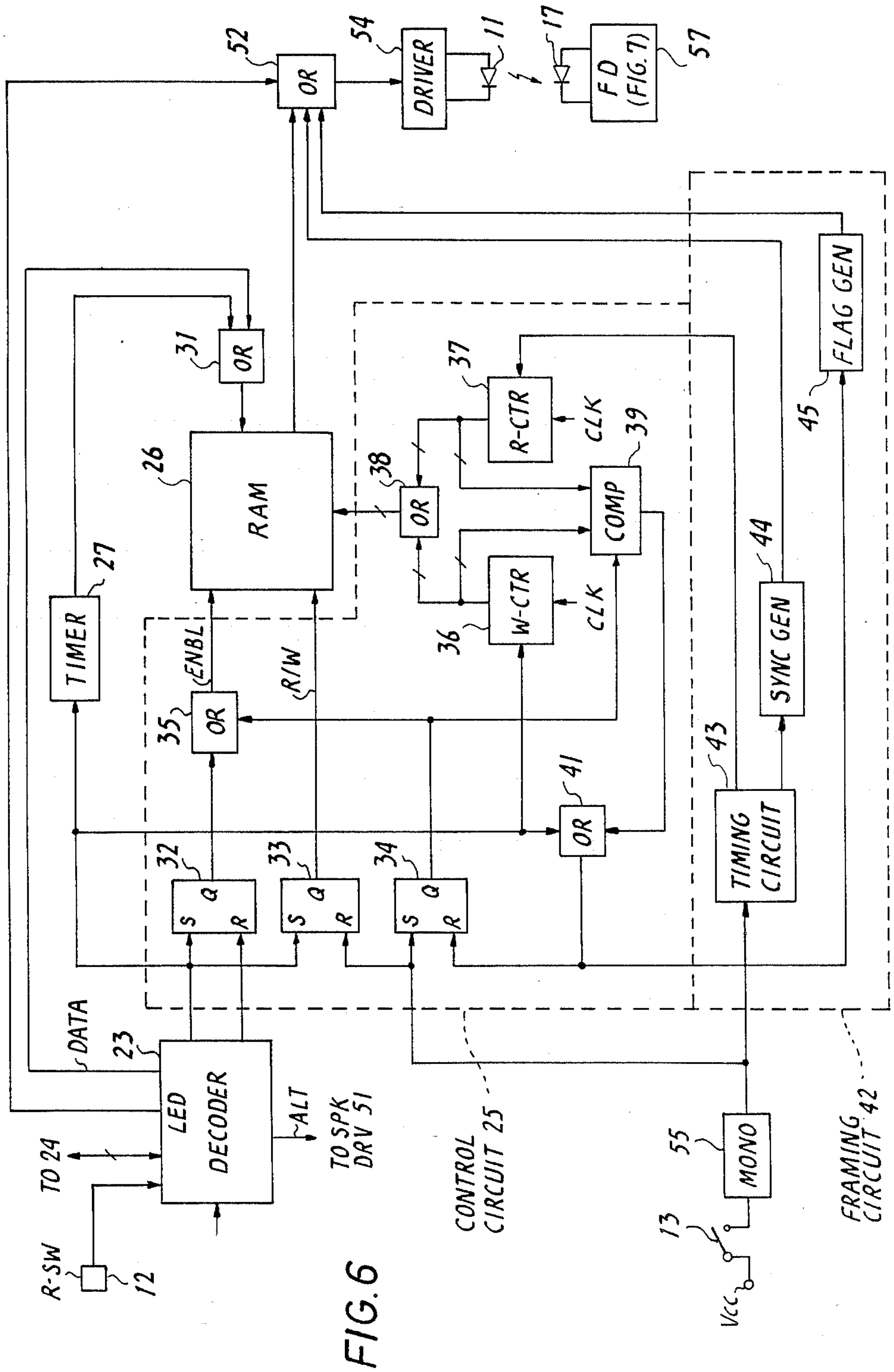
FIG. 6 is a circuit diagram of the radio pager according to a second embodiment of the invention.

Referring now to FIG. 6, a second embodiment of the present invention is illustrated. This embodiment provides visual and audible alarm during print operation. In FIG. 6, like parts are numbered with the same numerals as used in FIG. 4. This embodiment differs from the embodiment of FIG. 4 in that it includes a framing circuit 42 which is responsive to the output of monostable 55 to organize the calling address and time data into a frame format and optically transmit the frame to a printer control circuit. The framing circuit 42 comprises a timing circuit 43, a frame sync generator 44 and an end-of-data flag generator 45. Timing circuit 43 is connected to the output of monostable 55 to generate a first timing signal in response to the operation of print command key 13 to activate the sync generator 44 to generate a frame sync of a predetermined bit pattern. A second timing signal is generated immediately following the generation of a frame sync to enable the read-out counter 37. End-of-data flag generator 45 is connected to the output of OR gate 41 to generate an end-of-data flag in response to the end of data read-out from RAM 26 or in response to the reception of a start-of-call signal during print operation. The outputs of sync generator 44 and flag generator 45 are combined with the output of RAM 26 in the OR gate 52. With the pager 10 being placed on the printer 15 and the print command key 13 operated, data stored in RAM 26 is read therefrom and organized into a frame signal as mentioned above. Light-emitting diode 11 is excited to transmit the frame signal to the photodiode 17 which converts it into a corresponding electrical frame signal for coupling to a frame decoder 57.

Figure 7:
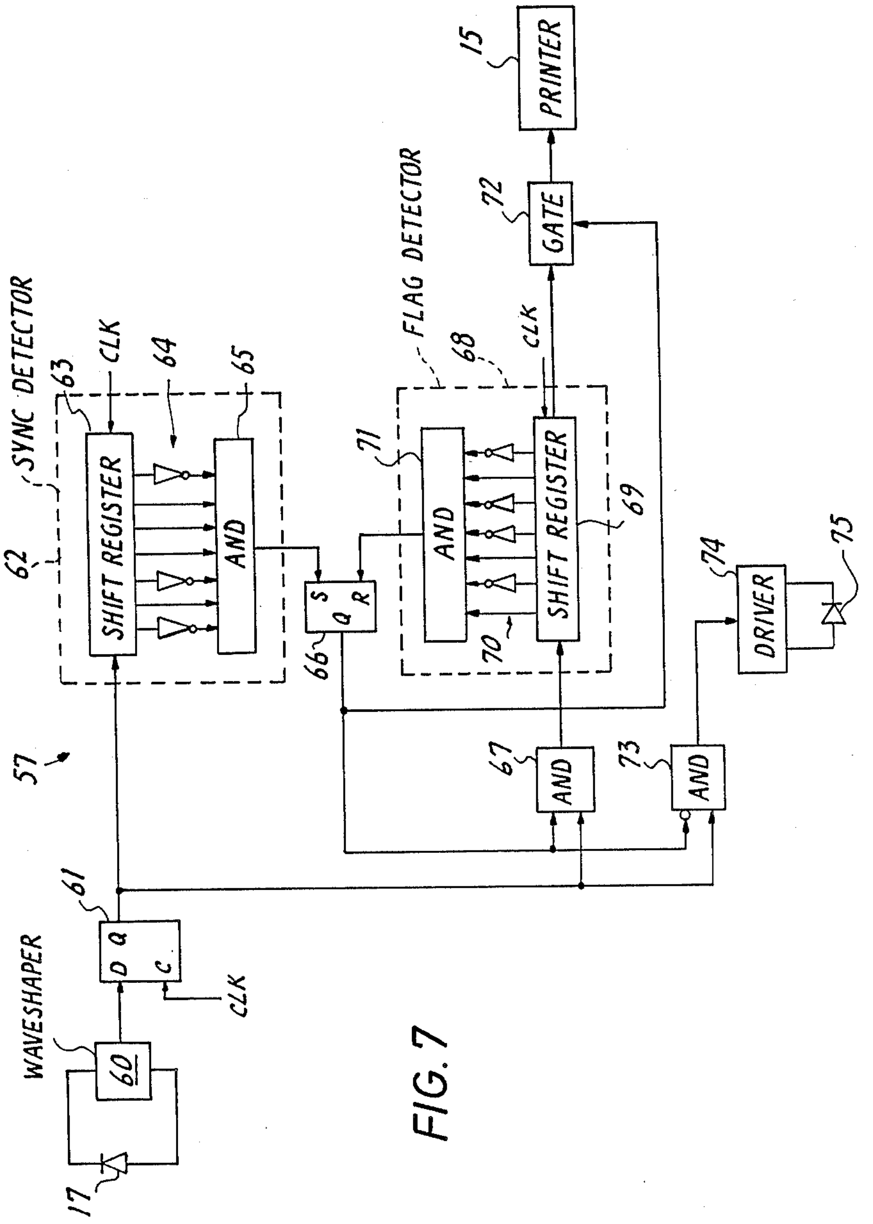
FIG. 7 is a circuit diagram of the printer according to the second embodiment.

In FIG. 7, the frame decoder 57 comprises a waveshaper 60 connected to the photodiode 17. A bit synchronizer or D-flip-flop 61 is connected to the output of waveshaper 60 to establish bit synchronization with the binary digits of the frame signal. The output of flip-flop 61 is applied to a frame sync detector 62 which comprises a shift register 63 into which the output of flip-flop 61 is supplied. A certain of the binary stages of shift register 63 are inverted by NOT gates 64 according to the pattern of the frame sync so that a logical 1 output is generated by an AND gate 65 when the frame sync is clocked into the shift register 63. A flip-flop 66 is triggered into a logical-1 output state in response to the logical-1 output of sync detector 62 to enable an AND gate 67 and disable an AND gate 73. The remainder of the frame is passed through the AND gate 67 to an end-of-data flag detector 68. Flag detector 68 comprises a shift register 69 having an input connected to the output of AND gate 67 and an output connected to the printer 15 through a gate 72 which opens in the presence of a logical-1 output from flip-flop 66. A certain of the binary stages of shift register 69 are inverted by NOT gates 70 according to the pattern of the end-of-data flag so that a logical-1 output is generated by an AND gate 71 when the end-of-data flag is clocked into the shift register 69. Flip-flop 66 is reset in response to the logical-1 output of the flag detector 68 to close the gate 72 so that printer 15 is supplied with the information contained in the data field of the frame signal and enable the AND gate 73. An LED driver 74 is connected to the output of AND gate 73 to excite a light-emitting diode 75 which is located on an appropriate position of the printer 15.

If a paging signal is received during print operation, a start-of-call signal is applied through OR gate 41 to the flag generator 45 and RAM 26 is switched to read-out mode, interrupting the print operation. An end-of-flag signal is supplied through OR gate 52 to LED driver 54, converted to optical form by light-emitting diode 11, reconverted to electrical form by photodiode 17 and detected by flag detector 68, enabling AND gate 73 while disabling AND gate 67. A flashing signal from decoder 23 is subsequently transmitted through the electrooptical path and passed through the enabled AND gate 73 to LED driver 74 to flash the light-emitting diode 75.

Figure 8:
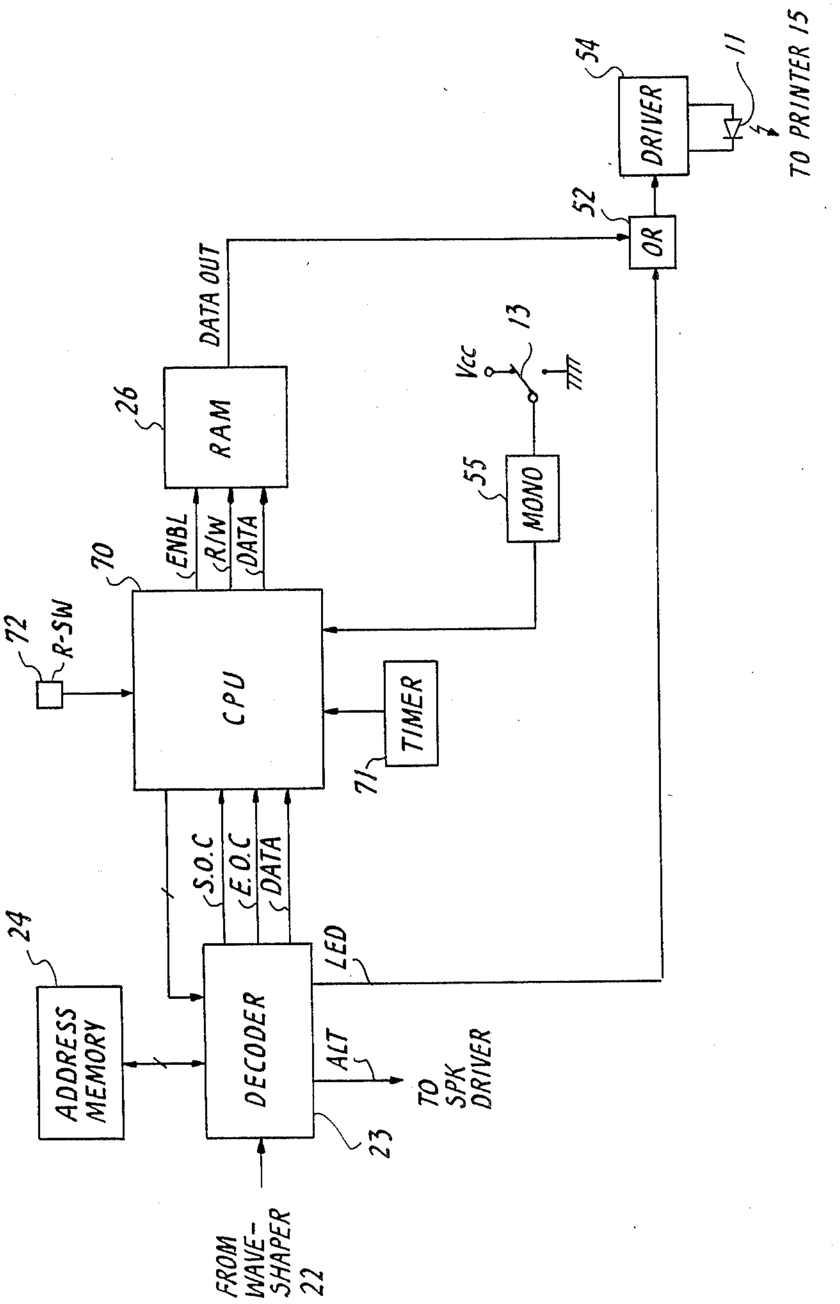
FIG. 8 is a block diagram of the radio pager according to a third embodiment of the invention.

In the previous embodiments, the arrival of a paging signal is given priority over the printer operation. In some instances, it is desirable to continue printer operation upon the arrival of a new paging signal by temporarily storing it into memory. FIG. 8 is a block diagram for a third embodiment in which a central processing unit (CPU) 70 is incorporated instead of the control circuit 25 of FIG. 4. Timer 71 and alarm reset switch 72 are connected to CPU 70 and decoder 23 provides start-of-call and end-of-call signals and calling address signal to CPU 70. CPU 70 supplies enable and read/write control signals and temporarily stored address and time data to RAM 26. CPU 70 is also responsive to the output of monostable 55 to initiate print operation. The operation of CPU 70 is described by programmed instructions shown in FIG. 9.

Figure 9:
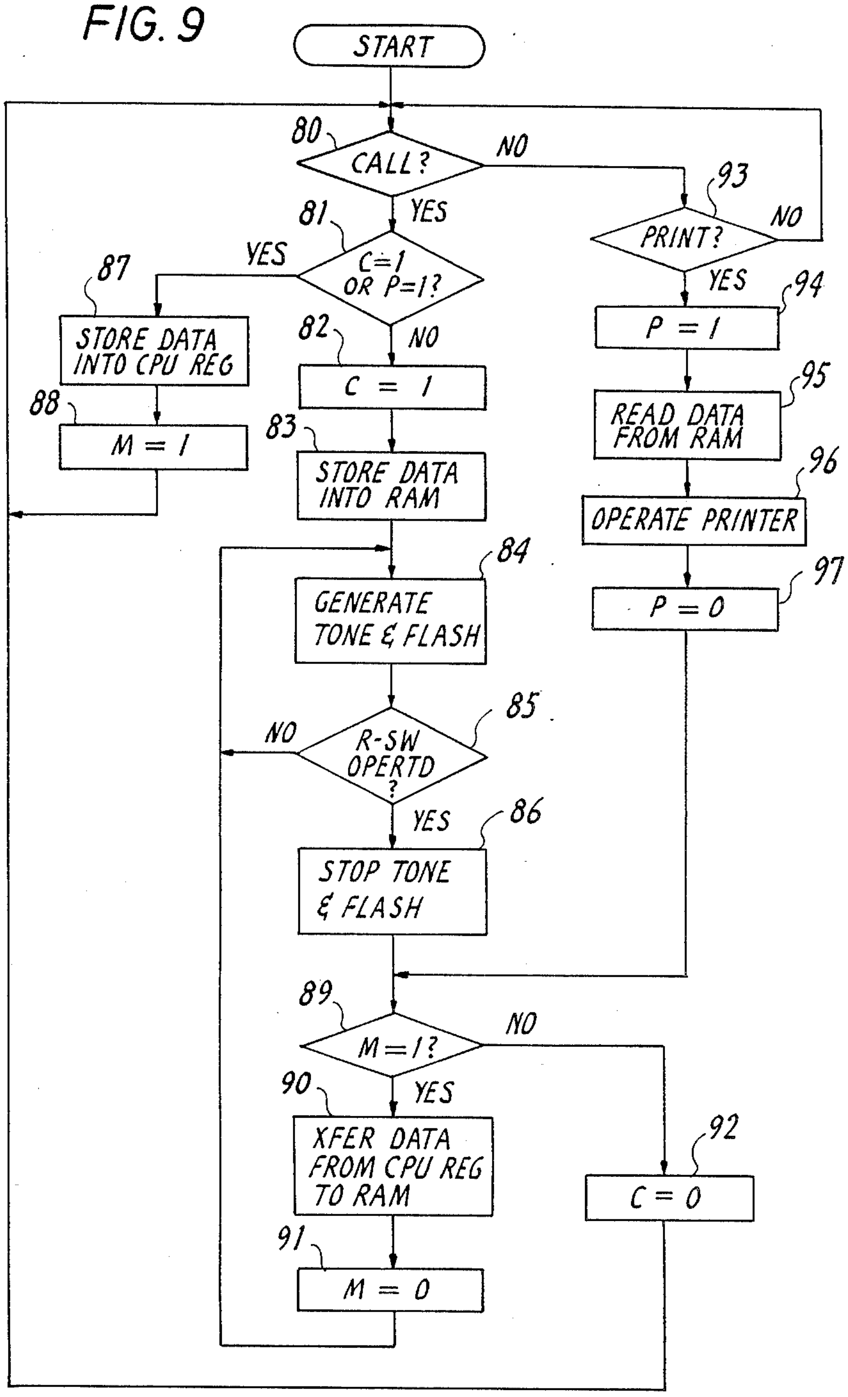
FIG. 9 is a flowchart associated with the third embodiment of the invention.

Referring to FIG. 9, a paging operation starts with a decision block 80 which checks to see if there is a start-of-call signal. If the answer is affirmative, exit is to a decision block 81 which determines if there is a call flag C=1 indicating that a previous paging signal is being processed or a print flag P=1 indicating that the printer is in operation. If the apparatus is neither in calling or print mode, exit from decision block 81 is to operations block 82 which directs the setting of the calling flag C. Control proceeds to operations block 83 which directs the writing of the received calling address data and the time data from timer 71 into RAM 26 and then to operations block 84 which directs the generation of a particular tone signal and a particular flashing signal. A decision block 85 determines whether the reset switch 72 is operated, and if it is, control proceeds to operations block 86 which directs the cessation of the alarm signals.

Meanwhile, if the answer in decision block 81 is affirmative, i.e., the apparatus is either in a calling mode or a print mode, exit is to operations block 87 which directs the writing of a newly arrived paging signal and time data into a register of the CPU. Exit from block 87 is to operations block 88 which directs the setting of a memory flag M indicating that data is temporarily stored in a CPU register. The temporarily stored data is retrieved and stored into RAM 26 by operations block 90 after control proceeds through blocks 80 to 86 or blocks 93 to 97 to decision block 89 which determines if there is a memory flag M=1. If the answer is affirmative, exit is to operations block 90 which directs the transfer of data from the CPU register to RAM 26. Control advances to operations block 91 which directs the resetting of the memory flag M. Exit now is to operations block 84 to repeat the generation of alarm signals to alert the user of the arrival of a new paging signal during print mode or a previous calling mode. Negative answer in decision block 89 causes an exit to operations block 92 which directs the resetting of the calling flag C.

If the answer in decision block 80 is negative, control goes to decision block 93 to determine if a print command signal is generated. If the answer is affirmative, exit is to operations block 94 which directs the setting of the print flag P. Exit then is to operations block 95 which directs the reading of data from RAM 26 into the printer 15 for operating the printer (block 96). Immediately following the end of a print operation, control proceeds to operations block 97 which directs the resetting of the print flag P. Exit from operations block 97 is to decision block 89 to determine if there is a new paging signal arrived during print operation. If it is, blocks 90, 91, 84 to 86 will be performed. Therefore, print operation is not interrupted by the arrival of a new paging signal and the data output of RAM 26 is applied through OR gate 52 to the LED driver 54. The flashing signal from decoder 23 is also applied through OR gate 52 to LED driver 54 to excite the LED 11 when the pager 10 is being carried by the user.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A selective calling radio pager comprising:

means for receiving a code signal transmitted on a radio channel and generating a flashing signal in response to the receipt of said code signal;

a memory;

manual command entry means for generating a command signal;

memory control means for writing the received code signal into said memory and reading the code signal from the memory in response to said command signal;

a light-emitting diode optically coupled to an external device; and means for coupling said flashing signal to said light-emitting diode in the absence of said command signal, causing said diode to give a visual indication of arrival of a message and coupling said code signal from said memory to said light-emitting diode in the presence of said command signal causing said diode to emit an optical version of said code signal to said external device.

2. A selective calling radio pager as claimed in claim 1, further comprising a photodetector mounted on said external device for converting said optical signal to a corresponding electrical signal and a second light-emitting diode responsive to an output signal from said photodetector.

3. A selective calling radio pager as claimed in claim 1, further comprising:

framing means having a sync generator for generating a sync signal and an end-of-data signal generator for generating an end-of-data signal, said framing means being responsive to said manual command signal for organizing said code signal read out of said memory into a frame signal by appending a sync signal generated by said sync generator to a starting point of said code signal and appending an end-of-data signal generated by said end-of-data signal generator to an ending point of said code signal and applying the frame signal to said light-emitting diode;

means responsive to said receiving means for causing said end-of-data signal generator to generate an end-of-data signal and applying the last-mentioned end-of-data signal to said light-emitting diode;

a photodetector for converting the optical signal generated by said light-emitting diode into a corresponding electrical signal;

detector means connected to said photodetector for detecting said sync signal and said end-of-data signal;

a second light-emitting diode; and means for coupling an output signal from said photodetector to said external device when said sync signal is detected by said detector means and coupling said output signal from said photodetector to said second light-emitting diode when said end-of-data signal is detected by said detector means.

4. A selective calling radio pager as claimed in claim 1, further comprising means for generating a time signal in response to said receiving means and writing the time signal into said memory with the received code signal.

5. A selective calling radio pager as claimed in claim 1, wherein said memory control means includes means for storing said received code signal in response to said receiving means when said memory is in a read-out mode and transferring the stored code signal to said memory at the end of said read-out mode.

6. A selective calling radio pager as claimed in claim 1, wherein said external device is a printer.

7. A selective calling radio pager as claimed in claim 1, wherein said code signal comprises a calling address signal.

8. A selective calling radio pager as claimed in claim 4, wherein said code signal comprises a calling address signal.

* * * * *